US012073654B1

(12) United States Patent
Blanc-Paques et al.

(10) Patent No.: US 12,073,654 B1
(45) Date of Patent: Aug. 27, 2024

(54) METHOD FOR IDENTIFYING A USER ENTERING AN AUTONOMOUS VEHICLE

(71) Applicant: Direct Current Capital LLC, Wilmington, DE (US)

(72) Inventors: Fabien Blanc-Paques, Mountain View, CA (US); Gahl Levy, Mountain View, CA (US); Tory Smith, Mountain View, CA (US); Chip J. Alexander, Belmont, CA (US); Vineet Jain, Mountain View, CA (US)

(*) Notice: Subject to any disclaimer, the term of this patent is extended or adjusted under 35 U.S.C. 154(b) by 0 days.

(21) Appl. No.: 17/107,682

(22) Filed: Nov. 30, 2020

Related U.S. Application Data

(63) Continuation of application No. 16/281,078, filed on Feb. 20, 2019, now Pat. No. 10,853,629.

(60) Provisional application No. 62/632,597, filed on Feb. 20, 2018.

(51) Int. Cl.
G06V 40/16 (2022.01)
B60R 25/25 (2013.01)
B60W 40/08 (2012.01)
G06Q 10/02 (2012.01)
G06Q 50/40 (2024.01)

(52) U.S. Cl.
CPC ............ *G06V 40/172* (2022.01); *B60R 25/25* (2013.01); *B60W 40/08* (2013.01); *G06Q 10/02* (2013.01); *G06Q 50/40* (2024.01); *B60W 2040/0809* (2013.01)

(58) Field of Classification Search
CPC ..... G06V 40/172; B60R 25/25; B60W 40/08; B60W 2040/0809; G06Q 10/02; G06Q 50/30
See application file for complete search history.

(56) References Cited

U.S. PATENT DOCUMENTS

| | | | |
|---|---|---|---|
| 6,144,293 A | 11/2000 | Plaschko et al. | |
| 6,271,745 B1 | 8/2001 | Anzai et al. | |
| 6,505,780 B1 | 1/2003 | Yassin et al. | |
| 6,992,562 B2 | 1/2006 | Fuks et al. | |
| 7,146,129 B2 | 12/2006 | Bostrom | |
| 7,672,666 B2 | 3/2010 | Hasan | |
| 7,698,078 B2 | 4/2010 | Kelty et al. | |
| 7,821,383 B2 | 10/2010 | Sultan et al. | |
| 7,928,829 B2 | 4/2011 | Hermann | |
| 8,024,116 B2 | 9/2011 | Terao | |

(Continued)

FOREIGN PATENT DOCUMENTS

CA 2990016 12/2016

Primary Examiner — Gregory M Desire
(74) Attorney, Agent, or Firm — Polsinelli PC

(57) ABSTRACT

One variation of a method for identifying a user entering an autonomous vehicle includes: receiving a ride request from the user, the ride request specifying a pickup location; at the autonomous vehicle, autonomously navigating to the pickup location, scanning a field near the autonomous vehicle for a human approaching the autonomous vehicle, and, in response to detecting the human proximal the autonomous vehicle, recording an image of the human; detecting a face of the human in the image; accessing a faceprint characterizing facial features of the user; and, in response to the face of the human detected in the image exhibiting features represented in the faceprint, identifying the human as the user and triggering a door of the autonomous vehicle to unlock for the user.

21 Claims, 4 Drawing Sheets

(56) References Cited

U.S. PATENT DOCUMENTS

| | | |
|---|---|---|
| 8,121,347 B2 | 2/2012 | Metaxas et al. |
| 8,207,860 B2 | 6/2012 | Enegren et al. |
| 8,299,895 B2 | 10/2012 | Harris |
| 8,634,822 B2 | 1/2014 | Silver et al. |
| 8,736,438 B1 | 5/2014 | Vasquez et al. |
| 8,937,528 B2 | 1/2015 | Protopapas |
| 8,947,202 B2 | 2/2015 | Tucker et al. |
| 9,035,750 B2 | 5/2015 | Sah et al. |
| 9,218,814 B2 | 12/2015 | Xiong |
| 9,351,102 B2 | 5/2016 | Tucker et al. |
| 9,405,363 B2 | 8/2016 | Hernandez-Abrego et al. |
| 9,769,616 B1 | 9/2017 | Pao et al. |
| 9,855,926 B2 | 1/2018 | Stauffer et al. |
| 9,911,166 B2 | 3/2018 | Reid et al. |
| 9,950,708 B1 | 4/2018 | Cullinane et al. |
| 10,008,069 B2 | 6/2018 | Elie et al. |
| 10,065,659 B2 | 9/2018 | Deligianni et al. |
| 10,088,846 B2 * | 10/2018 | Gao ................. H04W 4/02 |
| 10,104,525 B1 | 10/2018 | Kaiser et al. |
| 10,202,100 B1 | 2/2019 | Tucker et al. |
| 10,227,063 B2 | 3/2019 | Abreu |
| 10,248,119 B2 | 4/2019 | Kentley-Klay et al. |
| 10,290,074 B2 * | 5/2019 | Sweeney ............ G01C 21/3438 |
| 10,311,704 B1 | 6/2019 | Xu et al. |
| 10,336,294 B2 | 7/2019 | Grossmann |
| 10,409,289 B2 * | 9/2019 | Zhang ................ G06Q 10/1093 |
| 10,482,226 B1 | 11/2019 | Konrardy et al. |
| 10,504,094 B1 * | 12/2019 | Gaudin ............. G06Q 20/3278 |
| 10,535,271 B1 | 1/2020 | Dyer et al. |
| 10,576,934 B2 * | 3/2020 | Hassani ................ G06V 40/10 |
| 10,677,602 B2 * | 6/2020 | Rakah ................ G01C 21/3438 |
| 10,740,863 B2 * | 8/2020 | Iagnemma ............ G05D 1/0027 |
| 10,769,452 B2 * | 9/2020 | Rasmusson, Jr. ......... G06T 7/20 |
| 10,773,732 B1 | 9/2020 | Alexander et al. |
| 10,818,109 B2 | 10/2020 | Palmer et al. |
| 10,821,988 B2 * | 11/2020 | Li .......................... B60W 40/08 |
| 10,853,629 B2 * | 12/2020 | Blanc-Paques ........ G06Q 50/30 |
| 10,970,747 B2 * | 4/2021 | Miller ................ G06Q 30/0266 |
| 10,974,829 B2 | 4/2021 | Myslinski |
| 11,187,793 B1 | 11/2021 | Liu |
| 11,222,389 B2 | 1/2022 | Sweeney et al. |
| 11,417,214 B2 | 8/2022 | Murray et al. |
| 11,493,348 B2 | 11/2022 | Levy et al. |
| 11,592,312 B2 | 2/2023 | Rockmore et al. |
| 2002/0118579 A1 | 8/2002 | Lucy et al. |
| 2003/0098784 A1 | 5/2003 | Van Bosch et al. |
| 2003/0204290 A1 | 10/2003 | Sadler et al. |
| 2003/0231550 A1 | 12/2003 | Macfarlane |
| 2005/0001028 A1 | 1/2005 | Zuili |
| 2006/0267407 A1 | 11/2006 | Nagaoka et al. |
| 2006/0267781 A1 | 11/2006 | Coulter |
| 2010/0087987 A1 | 4/2010 | Huang et al. |
| 2010/0091995 A1 | 4/2010 | Chen et al. |
| 2010/0211770 A1 | 8/2010 | Alrabady et al. |
| 2010/0262348 A1 | 10/2010 | Nallapa et al. |
| 2011/0119734 A1 | 5/2011 | Crawford |
| 2011/0264304 A1 | 10/2011 | Burzio |
| 2012/0075059 A1 | 3/2012 | Fyke et al. |
| 2013/0030882 A1 | 1/2013 | Davis, III et al. |
| 2013/0104203 A1 | 4/2013 | Davis et al. |
| 2013/0143594 A1 | 6/2013 | Ghabra et al. |
| 2013/0204455 A1 | 8/2013 | Chia et al. |
| 2013/0332007 A1 | 12/2013 | Louboutin |
| 2014/0070917 A1 | 3/2014 | Protopapas |
| 2014/0089143 A1 | 3/2014 | Dione |
| 2014/0162598 A1 | 6/2014 | Villa-Real |
| 2015/0032621 A1 | 1/2015 | Kar et al. |
| 2015/0045013 A1 | 2/2015 | Simmons |
| 2015/0048927 A1 | 2/2015 | Simmons |
| 2015/0199685 A1 | 7/2015 | Betancourt et al. |
| 2015/0210287 A1 | 7/2015 | Penilla et al. |
| 2015/0241241 A1 | 8/2015 | Cudak et al. |
| 2015/0379793 A1 | 12/2015 | Murakami |
| 2016/0137141 A1 | 5/2016 | Chien et al. |
| 2016/0171574 A1 | 6/2016 | Paulucci et al. |
| 2016/0209489 A1 | 7/2016 | Schrabler et al. |
| 2016/0297325 A1 | 10/2016 | Jones |
| 2016/0332535 A1 | 11/2016 | Bradley et al. |
| 2017/0021282 A1 | 1/2017 | Comploi |
| 2017/0080900 A1 | 3/2017 | Huennekens et al. |
| 2017/0091856 A1 | 3/2017 | Canberk et al. |
| 2017/0126810 A1 | 5/2017 | Kentley et al. |
| 2017/0153714 A1 | 6/2017 | Gao et al. |
| 2017/0197627 A1 | 7/2017 | Wieneke et al. |
| 2017/0247040 A1 | 8/2017 | Miller et al. |
| 2017/0270490 A1 | 9/2017 | Penilla et al. |
| 2017/0330044 A1 | 11/2017 | Telpaz et al. |
| 2018/0061242 A1 | 3/2018 | Bavar et al. |
| 2018/0115620 A1 | 4/2018 | Diem |
| 2018/0126960 A1 | 5/2018 | Reibling et al. |
| 2018/0215392 A1 | 8/2018 | Kosaka et al. |
| 2018/0299900 A1 | 10/2018 | Bae et al. |
| 2018/0307926 A1 | 10/2018 | Tokatyan |
| 2018/0356830 A1 | 12/2018 | Haghighat et al. |
| 2018/0364723 A1 | 12/2018 | Cullinane et al. |
| 2018/0365400 A1 | 12/2018 | Lopez-Hinojosa et al. |
| 2019/0039546 A1 | 2/2019 | Elangovan et al. |
| 2019/0039570 A1 | 2/2019 | Foster et al. |
| 2019/0063942 A1 | 2/2019 | Kang |
| 2019/0176837 A1 | 6/2019 | Williams et al. |
| 2019/0197325 A1 | 6/2019 | Reiley et al. |
| 2019/0244320 A1 | 8/2019 | Sweeney et al. |
| 2019/0295421 A1 | 9/2019 | Bavar et al. |
| 2019/0297450 A1 | 9/2019 | Hwang et al. |
| 2019/0359220 A1 | 11/2019 | Wilson et al. |
| 2019/0369636 A1 | 12/2019 | Nishiyama et al. |
| 2019/0389486 A1 | 12/2019 | Murad et al. |
| 2019/0391250 A1 | 12/2019 | Cohen et al. |
| 2020/0005059 A1 | 1/2020 | Yamada et al. |
| 2020/0010051 A1 | 1/2020 | Dumov |
| 2020/0012979 A1 | 1/2020 | Song et al. |
| 2020/0043063 A1 | 2/2020 | London |
| 2020/0057487 A1 | 2/2020 | Sicconi et al. |
| 2020/0089248 A1 | 3/2020 | Coq et al. |
| 2020/0094963 A1 | 3/2020 | Myslinski |
| 2020/0117929 A1 | 4/2020 | Moon |
| 2020/0124428 A1 | 4/2020 | Hamilton et al. |
| 2020/0223454 A1 | 7/2020 | Fox et al. |
| 2020/0293799 A1 | 7/2020 | Herman |
| 2021/0110182 A1 | 4/2021 | Damaud et al. |
| 2021/0263586 A1 | 8/2021 | Wang |
| 2021/0397863 A1 | 12/2021 | Kose Cihangir et al. |
| 2022/0237277 A1 | 7/2022 | Rahman et al. |
| 2022/0301212 A1 | 9/2022 | Guizilini et al. |
| 2022/0355815 A1 | 11/2022 | Bill-Clark |
| 2022/0358769 A1 | 11/2022 | Wang et al. |
| 2023/0012629 A1 | 1/2023 | Shin et al. |

\* cited by examiner

METHOD FOR IDENTIFYING A USER ENTERING AN AUTONOMOUS VEHICLE

CROSS-REFERENCE TO RELATED APPLICATIONS

This Application is a continuation of U.S. patent application Ser. No. 16/281,078, entitled "METHOD FOR IDENTIFYING A USER ENTERING AN AUTONOMOUS VEHICLE," filed on Feb. 20, 2019, which claims the benefit of U.S. Provisional Application Ser. No. 62/632,597, entitled "METHOD FOR IDENTIFYING A USER ENTERING AN AUTONOMOUS VEHICLE," filed on Feb. 20, 2018, each of which is incorporated herein by reference in its entirety.

TECHNICAL FIELD

This invention relates generally to the field of autonomous vehicles and more specifically to a new and useful method for identifying a user entering an autonomous vehicle in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
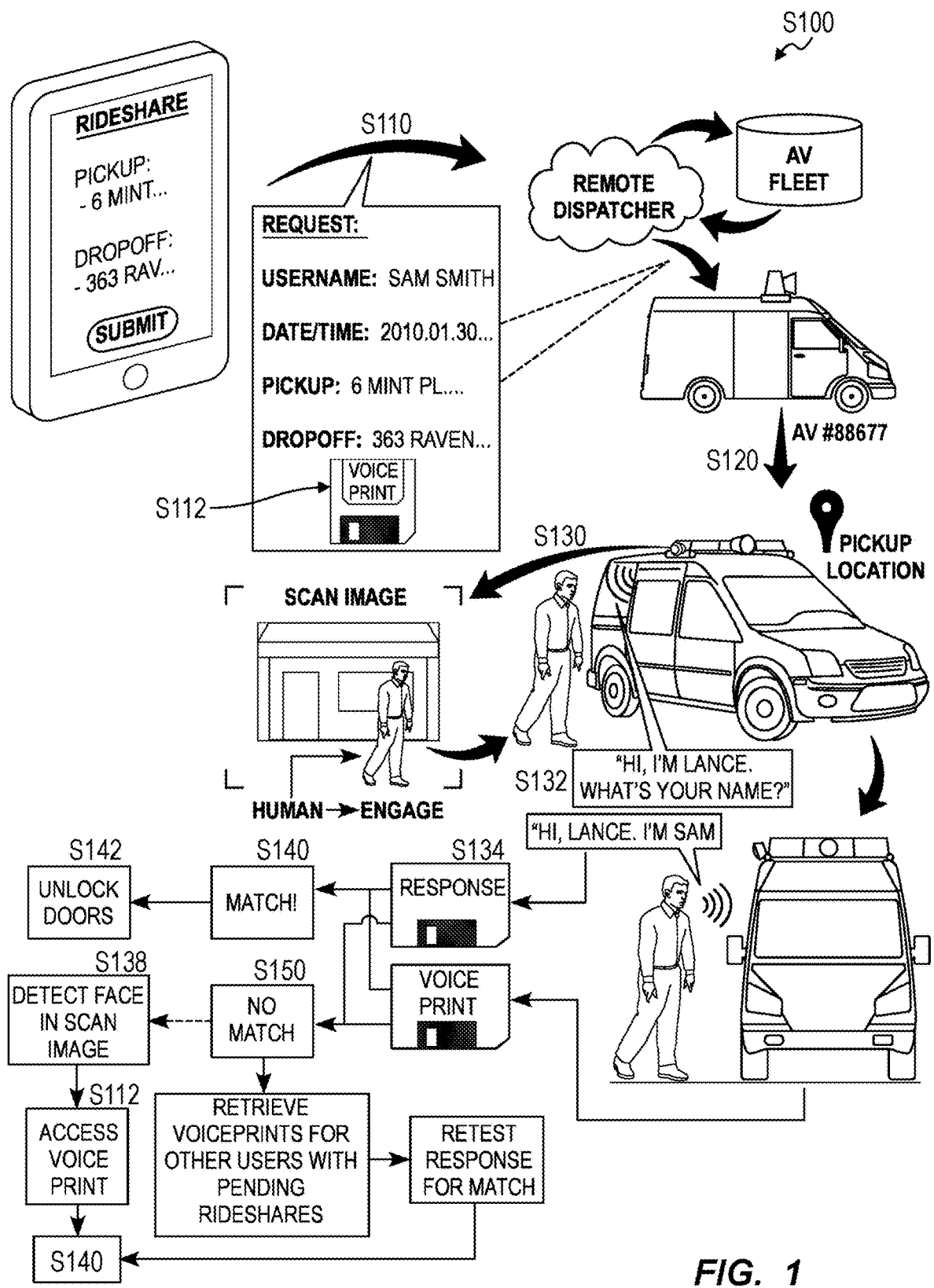
FIG. 1 is a flowchart representation of a method.
Figure 3:
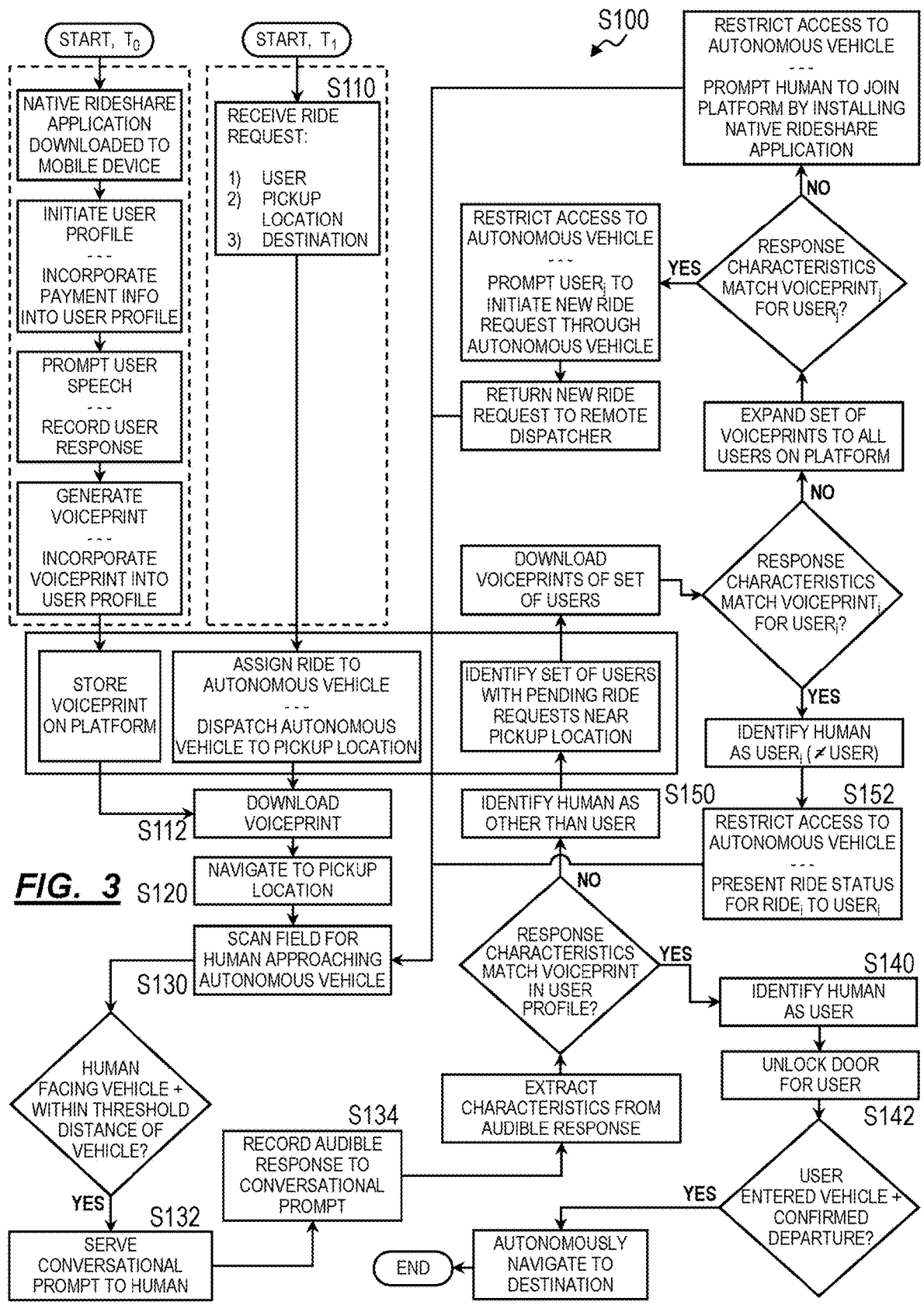
FIG. 3 is a flowchart representation of one variation of the method.

As shown in FIGS. 1 and 3, a method S100 for identifying a user entering an autonomous vehicle includes: remotely from the autonomous vehicle, receiving a ride request from the user, the ride request specifying a pickup location in Block S110; and accessing a voiceprint characterizing speech of the user in Block S112. The method S100 also includes, at the autonomous vehicle: autonomously navigating to the pickup location in Block S120; scanning a field near the autonomous vehicle for a human approaching the autonomous vehicle in Block S130; in response to detecting the human proximal the autonomous vehicle, outputting a conversational prompt to the human in Block S132; and recording an audible response of the human in Block S134. The method S100 also includes, in response to the audible response exhibiting characteristics represented in the voiceprint: identifying the human as the user in Block S140; and triggering a door of the autonomous vehicle to unlock for the user in Block S142.

The method S100 can further include, in response to the audible response exhibiting characteristics distinct from characteristics represented in the voiceprint: identifying the human as other than the user in Block S150; and serving a second prompt to the human indicating that the autonomous vehicle is reserved for other than the human in Block S152.

2. Applications

Generally, the method S100 can be executed in conjunction with an autonomous vehicle—such as in a rideshare fleet—to automatically identify a rider by her voice as the rider approaches and interacts with the autonomous vehicle prior to entry. In particular, the autonomous vehicle can implement Blocks of the method S100 to quickly confirm (or otherwise identify) a rider assigned to the autonomous vehicle by her voice rather than require the rider to use her smartphone as a key, to enter a code into the autonomous vehicle, or otherwise change her behavior or perform an additional, mental exercise to enter the autonomous vehicle.

Rather, by identifying a rider by her voice, the autonomous vehicle can: achieve a rapid, hands-free, device-free "handshake" with a rider when the rider and the autonomous vehicle initially engage at or near the rider's specified pickup location. Because a human driver may not be present in the autonomous vehicle to monitor humans attempting to enter the autonomous vehicle, the autonomous vehicle can also gate entry (e.g., by selectively unlocking doors) based on whether the autonomous vehicle has confirmed that a human approaching the autonomous vehicle is the same user who ordered the autonomous vehicle to its current pickup location. Because riders may typically introduce themselves orally when entering human-piloted rideshare vehicles, the autonomous vehicle can execute Blocks of the method S100 to integrate with and leverage this existing cultural norm for human-piloted rideshare vehicles in order to: identify a rider by her voice when this rider attempts to enter the autonomous vehicle; develop a stronger human-computer relationship with this rider through oral communications, which may improve rider comfort and acceptance of the autonomous vehicle; and communicate a personality of the autonomous vehicle to the rider through these audible interactions—even before the rider enters the autonomous vehicle. Furthermore, by identifying the rider by her voice rather than through her smartphone or through face detection in images of the rider recorded by the autonomous vehicle, the autonomous vehicle can execute Blocks of the method S100 to preserve the rider's sense of privacy.

The autonomous vehicle can also function as a mobile help desk (or "kiosk") to assist users assigned to other autonomous vehicles in the autonomous vehicle fleet to find their autonomous vehicles, such as by: identifying a user who has approached the autonomous vehicle by her voice; matching this user to another pending ride request with another autonomous vehicle; communicating to this user that this is not her autonomous vehicle; and communicating to the user where her autonomous vehicle is waiting for her or the estimated time of arrival of her autonomous vehicle at her designated pickup location. Similarly, the autonomous vehicle can execute Blocks of the method S100 to improve access to autonomous vehicles for users who are currently without a functional mobile device, who are less comfortable or capable of using mobile devices, or who prefer to hail an autonomous vehicle via the autonomous vehicle directly rather than through a mobile device.

For example, a user—who misplaced her mobile device or whose mobile device is currently non-operational—may approach the autonomous vehicle parked in a pickup location waiting for its rider and orally engage the autonomous vehicle to request assistance. The autonomous vehicle can identify the user by her voice (or by her facial features), collect ride request information from the user via a conversational interaction, and return this ride request and the user's identity to a remote dispatcher; and the remote dispatcher can then automatically dispatch another autonomous vehicle to this user's location, all without requiring the user to access her mobile device.

The method S100 is described below as executed by elements within an autonomous vehicle rideshare platform (hereinafter the "platform"), such as including: an autonomous vehicle configured to autonomously navigate between pickup and drop-off locations and to interface with riders (hereinafter "users"); a remote computer system configured to maintain user profile and voiceprint (and/or faceprint) information; a remote dispatcher or fleet manager configured to assign autonomous vehicles in the fleet to ride requests from users; and/or a native rideshare application through which users may submit ride requests at their smartphones or other computing devices. However, Blocks of the method S100 can be executed by elements of any other type or function within the platform.

3. Remote Ride Request

In Block S110, the platform can receive a ride request—specifying a pickup location and a destination—from a user. For example, the user can enter this ride request through an instance of the native rideshare application executing on her smartphone or other mobile device. The native rideshare application can then upload this request to the remote dispatcher, which can then: identify an autonomous vehicle that is both nearby and available or in the process of completing another route nearby; assign this autonomous vehicle to the user; and dispatch the autonomous vehicle to the pickup location specified in the user's ride request (or to a nearest mandated pickup location).

4. User Voiceprinting

In Block S112, the platform accesses a voiceprint characterizing speech of the user. Generally, in Block S112, the platform retrieves or generates a model (or "voiceprint") that represents the user's speech patterns and that the platform can later implement to identify the user approaching her assigned autonomous vehicle.

In one implementation, the platform generates and stores a voiceprint for the user during an initial setup period in which the user's profile is first created. For example, when the user first downloads an instance of the native rideshare application to her mobile device (e.g., a smartphone), the native rideshare application can: initialize a user profile for the user with user contact and payment information entered by the user; prompt the user to recite a particular phrase, recite a passcode, or state her name; generate a recording of the user responding to this prompt; and return this recording and user profile data to the remote computer system. The remote computer system can then: transform this recording into a voiceprint of the user; finalize the user profile; and store this voiceprint in the user profile.

In one example, the platform generates a name voiceprint that characterizes the user's oral recitation of her own name. In this example, during the initial setup period, the native rideshare application can: prompt the user to recite her name out loud to the mobile device multiple times; record these instances of the user speaking her name; and either locally generate a voiceprint of the user from these audio recordings or upload these recordings to the remote computer system for remote processing and transformation into the voiceprint. Later, an autonomous vehicle assigned to the user can implement this name voiceprint to identify the user when the user approaches the autonomous vehicle and orally introduces herself by name to the autonomous vehicle in order to gain access to the autonomous vehicle, such as described below.

In another example, the platform generates a conversational speech voiceprint that characterizes the user's speech patterns more generally. In this example, during the initial setup period, the native rideshare application can: enable and enforce voice controls for entering user contact information, rideshare preferences, and/or (certain elements of) payment information for a new user profile; record audible commands and responses from the user; populate fields in a new user profile based on these commands and responses; and then either locally generate a voiceprint of the user from these audio recordings or upload these recordings to the remote computer system for remote processing and transformation into the voiceprint. In a similar example, the native rideshare application can: present a phonetic pangram to the user during setup of the native rideshare application; prompt the user to recite the phonetic pangram; record the user reciting this phonetic pangram out loud; and then generate a conversational voiceprint for the user from this audio. The autonomous vehicle can later implement this conversational voiceprint to identify the user: when the user approaches the autonomous vehicle and engages in a brief oral conversation with the autonomous vehicle in order to gain access to the autonomous vehicle; when the user approaches the autonomous vehicle while speaking to a companion; or when the user approaches the autonomous vehicle while speaking on her phone.

The platform can also update the user's voiceprint over time, such as with audio data recorded by autonomous vehicles in the fleet each time the user approaches these autonomous vehicles and is positively identified by her voice; or with audio data recorded by the native rideshare application each time the user enters a ride request.

In another implementation, the platform generates a new voiceprint for the user for each ride request, such as in order to accommodate for possible vocal changes over time and/or increase user security. For example, the native rideshare application can: record a ride request entered from the user; and implement the foregoing methods and techniques to collect an audible response to a prompt from the user response to this ride request. The platform can then generate and store a temporary voiceprint for the user based on this audible response, then identify the user based on this temporary voiceprint when the user approaches her assigned autonomous vehicle, and then discard this voiceprint. In this example, the native rideshare application can: present a passphrase to the user; prompt the user to recite the passphrase; record the user reciting the passphrase; and generate a temporary voiceprint of the user based on this recording. Later when the user approaches her assigned autonomous vehicle, the autonomous vehicle or the native rideshare application can prompt the user to recite this passphrase to the autonomous vehicle, which the autonomous vehicle can record and compare to the user's temporary voiceprint in order to identify the user.

In another implementation, the autonomous vehicle: is pre-trained with a voice model to identify the user's voice; and instructs the user to recite a specific word or phrase—such as rendered on a display near a passenger door of the autonomous vehicle or presented to the user through her smartphone—before entering the autonomous vehicle. The autonomous vehicle can then identify the user according to her recitation of this word or phrase.

Alternatively, the platform can access an existing voiceprint of the user. For example, the user's smartphone may generate and maintain a voiceprint for the user for voice control functionalities; when the native rideshare application is installed on the smartphone, the native rideshare application can prompt the user to enable access to this voiceprint, and the platform can retrieve a copy or otherwise access this voiceprint from the user's smartphone accordingly in Block S112.

However, the platform can access, generate, and/or maintain a voiceprint—of any other type—in any other way in Block S112.

5. Pickup Location

In Block S120, the autonomous vehicle autonomously navigates to the pickup location specified by the user. Generally, in Block S120, the autonomous vehicle implements autonomous navigation techniques to autonomously navigate to the pickup location specified by the user.

6. Human Detection

Upon arriving at this pickup location, the autonomous vehicle can navigate into a shoulder, into a parking lot, or into a waiting zone and wait—with its doors locked—for the user to arrive and enter the autonomous vehicle. Once stopped at the pickup location, the autonomous vehicle can scan the field around the autonomous vehicle for a human approaching the autonomous vehicle in Block S130. In particular, the autonomous vehicle can scan its near field for a human approaching the autonomous vehicle, which may indicate this human's intent to enter the autonomous vehicle and therefore suggest that this human is the user who is assigned to the autonomous vehicle.

In one implementation, upon arriving at the pickup location specified in the ride request currently assigned to the autonomous vehicle, the autonomous vehicle can collect optical images (e.g., 2D color photographic images and/or 3D depth maps) of the field around the autonomous vehicle via a set of optical sensors arranged on the autonomous vehicle. For example, the optical sensors can be arranged proximal (e.g., adjacent, overheard) doors of the autonomous vehicle and can be dedicated to detecting approaching humans.

Alternatively, these optical sensors can be arranged on the roof, nose, and/or tail of the autonomous vehicle and can function to both: scan the field around the autonomous vehicle for an approaching human while the autonomous vehicle awaits arrival of a user; and collect data perception and localization data when the autonomous vehicle is in motion. (For example, in this implementation, the autonomous vehicle can: record two- or three-dimensional optical scans of the field around the autonomous vehicle via an optical sensor facing outwardly from the autonomous vehicle while waiting for its assigned user at a pickup location; interface with the human according to Blocks of the method S100 when an approaching human is thus detected in these optical scans; unlock a door of the autonomous vehicle for the human once identified as the autonomous vehicle's assigned user; receive confirmation to depart toward a destination location specified in the ride request from the user once the user enters the autonomous vehicle; record scan data of the field around the autonomous vehicle through this same set of optical sensors; elect a sequence of navigational actions based on these scan data; and autonomously execute this sequence of navigational actions in order to navigate toward the destination location.)

Furthermore, upon detecting a human near the autonomous vehicle, the autonomous vehicle can implement face detection, object tracking, and/or other computer vision techniques to track the human as the human approaches the autonomous vehicle. Once the autonomous vehicle detects the human now standing within a threshold distance (e.g., one meter) of a door of the autonomous vehicle and facing the autonomous vehicle, the autonomous vehicle can flag the human as intending to enter the autonomous vehicle and then execute a user identification routine—according to Blocks of the method S100 described below—to confirm that the human is the same user who placed the pending ride request and who is currently assigned to the autonomous vehicle. (The autonomous vehicle can additionally or alternatively detect the human nearby based on sensor data from other sensors in the autonomous vehicle, such as infrared, motion, or proximity sensors, etc.)

7. Voice-Based User Identification

In response to detecting the human approaching the autonomous vehicle, the autonomous vehicle can output a conversational prompt to the human in Block S132 and record the human's audible response in Block S134, as shown in FIGS. 1 and 3. The autonomous vehicle can then identify the human as the user in Block S140 in response to the user's response exhibiting characteristics represented in the voiceprint.

In one implementation, when the autonomous vehicle is assigned to the user's ride request, the autonomous vehicle accesses the voiceprint from the user's profile, such as by downloading and temporarily storing a local copy of the voiceprint. The autonomous vehicle can then locally compare a local audio recording to this copy of the voiceprint to determine whether a human nearby is the user thus assigned to the autonomous vehicle.

In the implementation described above in which the platform generates and stores name voiceprints characterizing user recitations of their own names in Block S112, the autonomous vehicle can initiate a user identification routine by issuing an audible prompt to the human to identify herself by name when the human is detected near the autonomous vehicle (e.g., within one meter of and facing a door or trunk of the autonomous vehicle, as described above). For example, the autonomous vehicle can (re)play—through an outwardly-facing speaker on the autonomous vehicle—an audio prompt including, "Hi. Did you request a ride with me? If so, can you tell me your name?" In another example in which the autonomous vehicle is assigned a name (e.g., by the remote dispatcher or by the user), the autonomous vehicle can play an audio prompt including, "Hi. I'm Enzo. What's your name?" The autonomous vehicle can then implement a local copy of the user's name voiceprint to determine whether the human currently interacting with the autonomous vehicle is the user assigned to the autonomous vehicle.

Alternatively, in the implementation described above in which the platform accesses conversational voiceprints characterizing user recitations of their own names in Block S112, the autonomous vehicle can initiate a conversation with the user and then implement the conversational voiceprint to determine whether this human is the user based on words spoken by the human during this interaction.

Yet alternatively, if the autonomous vehicle determines that the human approaching the autonomous vehicle is already speaking, such as on her phone or to a companion—and if the user has not opted out of ambient voice tracking by autonomous vehicles in the fleet—the autonomous vehicle can: record this conversation; and compare these audible data to the user's voiceprint to determine whether the human is the user without interrupting the human's conversation. If the autonomous vehicle thus confirms that the human is the user, the autonomous vehicle can unlock the door(s) of the autonomous vehicle and audibly greet the user by name when she arrives at the autonomous vehicle.

In one implementation, the autonomous vehicle records an audio track while interfacing with the human, such as through an exterior-facing microphone nearest the detected location of the human. The autonomous vehicle simultaneously implements speaker identification techniques locally to compare the audio recording to a voiceprint of the user to determine whether the human is the user currently assigned to the autonomous vehicle. For example, when the remote dispatcher assigns the autonomous vehicle to the user, the remote dispatcher can upload a current voiceprint—stored with the user's profile—to the autonomous vehicle; the autonomous vehicle can later implement speaker identification techniques to determine whether a segment of an audio snippet recorded during an interaction with a human standing near a door of the autonomous vehicle matches this voiceprint. Alternatively, the autonomous vehicle can stream this audio recording to a remote computer system, and the remote computer system can remotely compare this audio recording to the voiceprint to determine whether the human is the user assigned to the autonomous vehicle; and the remote computer system can return such determination to the autonomous vehicle in (near) real-time.

In one variation in which the autonomous vehicle detects multiple humans standing near two or more doors of the autonomous vehicle, the autonomous vehicle can implement the foregoing process in parallel for each human—such as by outputting an audible prompt and recording an audio signal through a speaker and a microphone, respectively, adjacent each door of the autonomous vehicle—to determine whether one of these humans is the user currently assigned to the autonomous vehicle.

8. Human Voice Identified as User

In Block S142, the autonomous vehicle can unlock a door of the autonomous vehicle for the user upon identifying the human as the user assigned to the autonomous vehicle, as shown in FIGS. 1 and 3.

In one implementation, if the autonomous vehicle (or the remote computer system) confirms that the human currently interacting with the autonomous vehicle is the user currently assigned to the autonomous vehicle, the autonomous vehicle can: unlock a single door nearest the human; confirm that the user has entered the autonomous vehicle when this door opens and then closes again; and then begin autonomous navigation toward a destination location previously specified by the user. Similarly, in the variation described above in which the autonomous vehicle detects multiple distinct humans near various doors of the autonomous vehicle, the autonomous vehicle can unlock each of these doors once the autonomous vehicle identifies one of these humans as the user.

In another implementation, if the autonomous vehicle identifies a human standing near a trunk of the autonomous vehicle as the user, the autonomous vehicle can unlock the trunk and all doors of the autonomous vehicle. Alternatively, if the autonomous vehicle identifies the human standing near the trunk of the autonomous vehicle as the user, the autonomous vehicle can: unlock the trunk for the user; track the user walking toward a particular door of the autonomous vehicle via exterior-facing sensors integrated into the autonomous vehicle; and selectively unlock this particular door for the user.

Yet alternatively, once the autonomous vehicle (or the remote computer system) identifies a human near the autonomous vehicle as the user, the autonomous vehicle can unlock all doors and storage compartments of the autonomous vehicle for the user.

8.1 Autonomous Vehicle Departure

The autonomous vehicle can then confirm that the user has entered the autonomous vehicle once at least one door is opened and then closed and can begin autonomously navigating to the user's specified destination once all doors are closed (and once an occupant in the vehicle provides a physical or audible command to begin the trip).

In one implementation, in response to the user entering the autonomous vehicle, the autonomous vehicle can serve a departure prompt to the user to confirm departure toward the destination location specified in the user's ride request. For example, the autonomous vehicle can output—through a speaker inside a cabin of the autonomous vehicle—a prompt to orally confirm departure, such as by replaying an audio recording reciting, "Ready to go?" The autonomous vehicle can then: monitor audible levels inside the cabin of the vehicle; record a second audible response to this departure prompt; detect confirmation of departure in this second audible response (e.g., by interpreting a "yes" or "ready" statement in the second audible response); and identify the user as a source of this second audible response by confirming similarities between the second audible response and the user's voiceprint. Then, if the autonomous vehicle thus detects confirmation of departure in the second audible response and identifies the user as the source of the second audible response, the autonomous vehicle can depart toward the destination location. Therefore, the autonomous vehicle can confirm both presence of the user in the autonomous vehicle and that the user is prepared for departure based on a response to the departure prompt output served to occupants of the autonomous vehicle.

Alternatively, the autonomous vehicle can: implement similar methods and techniques to detect the user—occupying the vehicle—in a video feed recorded by a camera inside the cabin; confirm that the user is ready for departure based on an oral command spoken by the user or based on selection of a physical button in the cabin; and then depart toward the destination location only after both presence and readiness of the user are confirmed.

9. Human Voice not Identified as User

However, if the autonomous vehicle (or the remote computer system) fails to identify the human (or one of multiple humans) detected near the autonomous vehicle as the user assigned to the autonomous vehicle, the autonomous vehicle (or the remote computer system) can execute additional processes during the user identification routine to confirm that the human is not the user, to identify the human as assigned to another autonomous vehicle, or to identify the human as unknown to the platform, etc., as shown in FIG. 3. In particular, the autonomous vehicle (or the remote computer system) can identify a human—near the autonomous vehicle—as other than the user currently assigned to the autonomous vehicle if the audible response of the human to the autonomous vehicle exhibits characteristics distinct from characteristics represented in the voiceprint of the user. The autonomous vehicle (or the remote computer system) can then execute additional processes to identify the human, such as by expanding comparison of this audible response to voiceprints of other known users on the platform and/or by comparing an image of the human to faceprints of known users on the platform.

9.1 Variation: Facial Recognition

Figure 2:
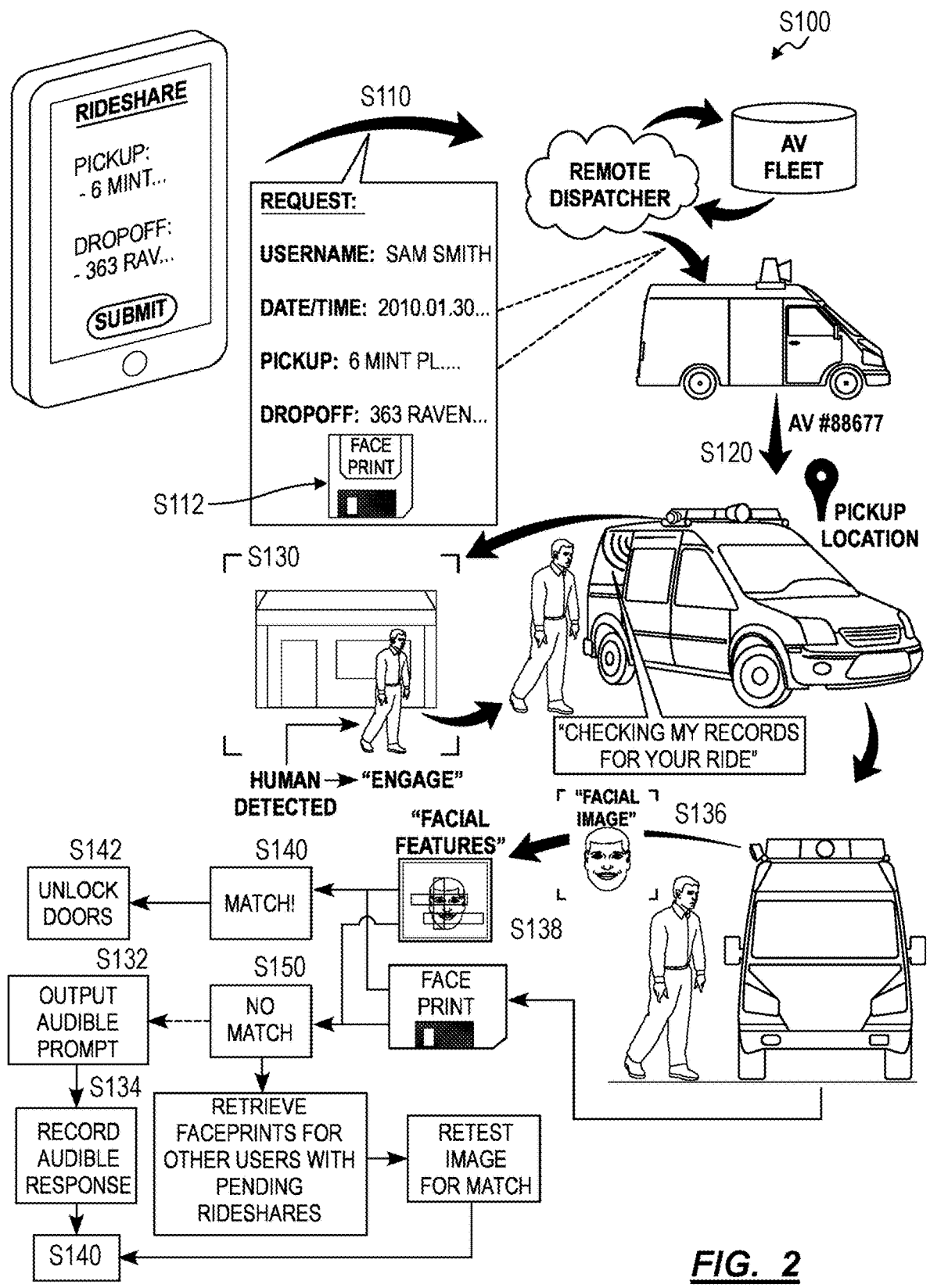
FIG. 2 is a flowchart representation of one variation of the method.
Figure 4:
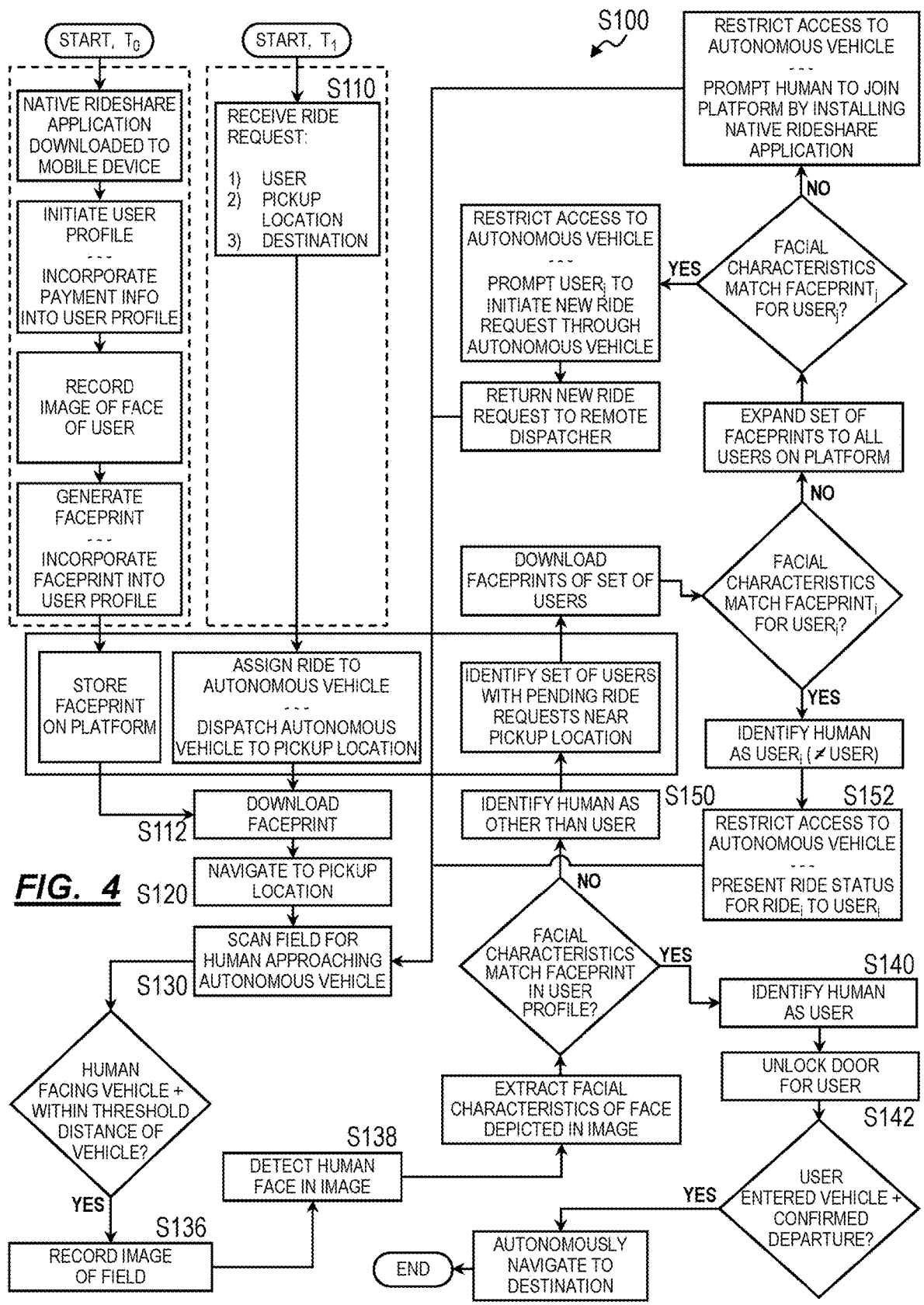
FIG. 4 is a flowchart representation of one variation of the method.

In one implementation shown in FIGS. 1, 2, and 4, after failing to verify the identity of human based on the audible response and the voiceprint of the user, the autonomous vehicle: records an image of the human; detects the human in the image; and implements facial recognition techniques to determine whether the human exhibits facial features that sufficiently match a stored faceprint of the user, such as generated from data previously collected by other autonomous vehicles in the fleet when occupied by the user or previously collected by the user's mobile computing device when entering the ride request or initializing her user profile.

For example, in response to identifying the human as other than the user or otherwise failing to match the audible response of the human to the voiceprint of the user, the autonomous vehicle can: record an image of the human via an optical sensor facing outwardly from the autonomous vehicle; and upload this image to the remote computer system. The remote computer system can then: detect a face of the human in the image; access a stored faceprint characterizing facial features of the user; identify the human as the user if the face of the human detected in the image exhibits features represented in the faceprint; and then selectively return a trigger to the autonomous vehicle to unlock the door for the user accordingly.

Therefore, in this implementation, the platform can maintain "faceprints" of users and implement these faceprints to identify their corresponding users in images (e.g., color photographic images) recorded by autonomous vehicles in the fleet. For example, like voiceprints described above, the platform can access images of the user's face through the native rideshare application executing on the user's smartphone and then extract features representative of the user's facial structure from these images to generate a faceprint for the user. In particular, during a setup period at the user's mobile device, the native rideshare application can: initialize a user profile for the user; record an optical scan (e.g., a two-dimensional optical scan, a three-dimensional point cloud) of the user via an optical sensor (e.g., a color camera, a projected-light depth sensor) integrated into a mobile device associated with the user; and upload user profile data and the optical scan to the remote computer system. The remote computer system can then: transform the optical scan into a faceprint of the user; and store the faceprint in the user profile.

In another example, the platform can access a faceprint or similar representation from an operating system executing on the user's smartphone, such as a faceprint that the operating system implements to automatically unlock the smartphone when the user's face is detected by the smartphone. In yet another example, the platform can aggregate images of the user—recorded by autonomous vehicles in the fleet when the user approached or occupied these autonomous vehicles in the past—and then compile these images to generate a faceprint of the user.

However, the platform can access or generate a faceprint for the user in any other way.

Similar to methods and techniques described above, the remote computer system can upload the faceprint for the user to the autonomous vehicle when the user's ride request is assigned to the autonomous vehicle. When the autonomous vehicle arrives at the designated pickup location, detects a human nearby, and fails to identify the human as the user based on the user's voiceprint and the human's audible response to a prompt, the autonomous vehicle (or the remote computer system) can compare an image of the human—recorded by a sensor on the autonomous vehicle—to the user's faceprint to determine whether the human is (or is sufficiently similar to) the user.

Alternatively, the autonomous vehicle can: default to attempting to identify the human as the user based on the user's faceprint and an image of the human recorded by the autonomous vehicle; and then execute methods described above to identify the human as the user based on the user's voiceprint and the human's audible response to a prompt if the autonomous vehicle fails to match a face detected in the image of the human to the user's faceprint, as described below.

Additionally or alternatively, the platform can develop and refine a faceprint of the user over time based on data collected by the native rideshare application executing on the user's mobile device and/or based on image data collected by autonomous vehicles when interfacing with the user and then transition from identifying the user based on the user's speech to identifying the user based on the user's facial features once the platform has developed a sufficiently robust faceprint of the user. For example, the native rideshare application can record a two-dimensional color image of the user during initial setup or when the user submits a ride request, and the platform can store this two-dimensional color image as an initial faceprint of the user. Later, when the autonomous vehicle arrives at the pickup location, the autonomous vehicle can: record a three-dimensional optical scan of a human nearby via an optical sensor (e.g., a LIDAR sensor, and structure light depth sensor) facing outwardly from the autonomous vehicle; compare the two-dimensional faceprint of the user to this three-dimensional optical scan of the human; and match three-dimensional features in the three-dimensional optical scan to two-dimensional features in the two-dimensional color image in order to identify the human as the user. Then, in response to identifying the human as the user, the autonomous vehicle (or the remote computer system) can update the two-dimensional faceprint of the user to further include three-dimensional features extracted from the three-dimensional optical scan.

Therefore, the autonomous vehicle (or the remote computer system) can confirm that the human is the user if either the face in the image of the human matches the user's faceprint or a voice in the audio recording of an interaction with the human matches the user's voiceprint. However, if the autonomous vehicle (or the remote computer system) fails to match the audible or visible characteristics of the human to the voiceprint or the faceprint of the user, the autonomous vehicle (or the remote computer system) can expand a search of faceprints and/or voiceprints of other known users on the platform to attempt to identify the human.

9.2 Expanded Search for Identity

Additionally or alternatively, if the autonomous vehicle fails to identify the human based on the user's voiceprint (and/or faceprint), the autonomous vehicle can expand its search to other voiceprints (and/or faceprints) of other users who recently requested rides with autonomous vehicles in the fleet. In particular, the autonomous vehicle can strategically expand its search for other known users who may match the human currently engaging the autonomous vehicle based on the location of the autonomous vehicle and the human, a name provided by the human to the autonomous vehicle, and/or a current rideshare queue, etc. in order to rapidly identity the human with minimal local or remote processing, as shown in FIGS. 1 and 3.

In one implementation, if the autonomous vehicle fails to identify the human based on the user's voiceprint (and/or faceprint), the autonomous vehicle (or the remote computer system) can query the remote dispatcher for other autonomous vehicles waiting nearby (e.g., within three city blocks of the autonomous vehicle's current location) for their assigned users or currently navigating to pickup locations nearby. The platform can then compile a set of profiles of users associated with pending ride requests near the autonomous vehicle and who may have mistaken the autonomous vehicle for their own assigned autonomous vehicles. The autonomous vehicle (or the remote computer system) can also: parse a name (e.g., a first name or a first name and a last name) of the human from the audio recording of the autonomous vehicle's recent interaction with the human; and further filter this list of user profiles to include other profiles of users with the same or similar (e.g., "sounds like") name(s). The autonomous vehicle (or the remote computer system) can then: access a voiceprint stored for each user profile in this filtered set; implement methods and techniques described above to compare the human's voice to these other voiceprints; determine that the human is a different user assigned to another autonomous vehicle waiting for its rider (i.e., the human) nearby or en route to collect the human from a pickup location nearby if such a match is detected; and provide feedback or assistance to this human accordingly, as described below.

However, if the autonomous vehicle (or the remote computer system) identifies no such match between the human's voice and voiceprints in this set, the autonomous vehicle can further expand its search to identify the user. For example, the autonomous vehicle (or the remote computer system) can further expand its search to a corpus of users with the same or similar name(s) and who previously submitted ride requests with pickup locations nearby (e.g., within six city blocks) within a recent period of time (e.g., the last month), access voiceprints of these users, and repeat the foregoing process to identify the human based on a match between the human's voice and one voiceprint in this expanded set. The autonomous vehicle (or the remote computer system) can continue to expand the search for the identity of the human—based on voiceprints (and/or faceprints) of known users in the platform—until a match is found or until the human's voice (or face) has been tested against all known users in the platform.

The autonomous vehicle (or the remote computer system or the platform generally) can implement the foregoing methods and techniques in (near) real-time during this interaction with the human in order to quickly identify the human as the user, identify the human as a user assigned to another autonomous vehicle for another pending ride request nearby, or note the human as unknown, such as within seconds of the human approaching the autonomous vehicle and/or speaking to the autonomous vehicle.

9.3 Alternative Vehicle-Human Interactions to Identify the Human

If the autonomous vehicle (or the remote computer system) fails to match the human to a known user—such as based on voiceprints and/or faceprints stored for known users in the platform—the autonomous vehicle can output an audio prompt and/or render a visual prompt on an exterior-facing display that the autonomous vehicle has been unable to identify the human but that the human may provide alternate means of identification in order to access the autonomous vehicle.

For example, if the autonomous vehicle outputs a first audible prompt asking the human to identify herself, as described above, and then is unable to identify the human from her response, the autonomous vehicle can then output a second audible prompt that recites, "I am having trouble finding you in my system. I am reserved for Sam. Are you Sam?" If the human then replies orally in the affirmative, the autonomous vehicle can output a third audible prompt that recites:

"Oh, great! Can you give me the street number of your billing address or the confirmation code we sent you in the app when you booked this ride? Alternatively, you can tap your NFC-enabled phone on the reader above the door."

Pending a correct response from the human, the autonomous vehicle can: confirm that the human is the user assigned to the autonomous vehicle; unlock the door(s) of the autonomous vehicle for the user; and update a faceprint and/or a voiceprint in the user's profile based on an image and/or an audio recording of the user recorded during this interaction.

In another example, after identifying the human as other than the user currently assigned to the autonomous vehicle: the remote computer system can send a passcode to the user's mobile device, such as in the form of a text message or application notification; and the autonomous vehicle can serve a prompt to the user to manually enter the passcode into a keypad arranged on the exterior of the autonomous vehicle. (Alternatively, the native rideshare application can present this passcode to the user when the user confirms the ride request.) If the human enters the correct passcode, then the autonomous vehicle can unlock a door for the human.

However, if the human provides an incorrect response to the second prompt and the autonomous vehicle (or the remote computer system) remains unable to identify the human, the autonomous vehicle can communicate to the human that is it unable to verify the human's identity and is therefore unable to permit the human to access the vehicle. The autonomous vehicle can then: serve a visual or audible prompt to the human to download the native rideshare application in order to enter a ride request; and/or provide the human a complaint number, a phone number for customer service, and a prompt call customer service for assistance.

10. Human Assigned to Other Autonomous Vehicle

In the foregoing implementations, if the human currently interacting with the autonomous vehicle provides a name different from that of the user assigned to the vehicle or if the autonomous vehicle otherwise determines that the human's voice does not match the voiceprint for the user assigned to the autonomous vehicle, the autonomous vehicle can: access pending ride requests specifying pickup locations nearby (e.g., within three blocks of the autonomous vehicle's current location); access voiceprints for users associated with these other pending ride requests; and compare these voiceprints to an audio recording of the human's interaction with the autonomous vehicle to determine whether the human is a second user assigned to a second autonomous vehicle waiting nearby or currently en route to a pickup location nearby.

Upon identifying the human as a second user assigned to a second autonomous vehicle, the autonomous vehicle can provide assistance to the second user in locating the second autonomous vehicle currently assigned to her. For example, the autonomous vehicle can access the location of the second autonomous vehicle from the remote dispatcher or communicate with the second autonomous vehicle directly to determine the location of the second autonomous vehicle (e.g., absolutely or relative to the autonomous vehicle). If the autonomous vehicle determines that the second autonomous vehicle is parked nearby, the autonomous vehicle can output an audible and/or visual prompt to the second user indicating the location of the second autonomous vehicle and/or identifying features of the second autonomous vehicle. In this example, the autonomous vehicle can output an audible prompt that recites, "Hi Sarah. I'm reserved for Sam, but I think your car is waiting on the opposite side of the street—it's the blue van." Alternatively, if the autonomous vehicle determines that the second autonomous vehicle is still en route to the second user's pickup location, the autonomous vehicle can provide the estimated time of arrival of the second autonomous vehicle for the second user. In this example, the autonomous vehicle can output an audible prompt including, "Hi Sarah. I'm reserved for Sam, but your car will arrive in approximately 45 seconds. It's a blue van and should pull up about 30 feet behind me."

In a similar example, in response to identifying the human as other than the user, the remote computer system can: identify a second ride request received from a second user, currently pending, and designating a second pickup location proximal the pickup location; access a second voiceprint characterizing speech of this second user; and compare the recording of the human's audible response at the autonomous vehicle to this second voiceprint to determine whether the human is the second user. Then, if the audible response of the human exhibits characteristics represented in the second voiceprint, the remote computer system can: identify the human as the second user; retrieve a status of a second autonomous vehicle assigned to the second ride request associated with the second user; and serve this status to the autonomous vehicle. For example, the remote computer system can access: an estimated time of arrival of the second autonomous vehicle to a second pickup location designated in the second ride request; a description of the second autonomous vehicle; and/or an address, map, or other description of the second pickup location. The autonomous vehicle can then present the status of the second autonomous vehicle to the second user, such as by rendering the estimated time of arrival and the description of the second autonomous vehicle on an exterior-facing display arranged on the autonomous vehicle or by outputting an audible message describing the status of the second autonomous vehicle via an outwardly-facing speaker arranged on the autonomous vehicle. Additionally or alternatively, the remote computer system can serve the status of the second autonomous vehicle to the second user's mobile device, which can then similarly present these status data to the second user.

In the foregoing example, the autonomous vehicle can repeat the foregoing methods and techniques to check the identify of the human at the autonomous vehicle against stored voiceprints (and/or faceprints) of each user in a set of users associated with the current, pending ride request designating pickup locations near the current location of the autonomous vehicle until a match is detected or until this list of users is exhausted.

The autonomous vehicle can therefore assist a known user in finding her assigned autonomous vehicle while the autonomous vehicle waits for its assigned user to arrive, identify herself, and board the autonomous vehicle.

11. Human Identified but not Associated with a Pending Ride Request

In the implementation described above in which the autonomous vehicle (or the remote computer system) identifies the human as a second, known user in the platform but for whom a ride request is not currently pending, the autonomous vehicle can automatically output an audible prompt and/or render a visual prompt asking the second user if she would like to request a rideshare with another autonomous vehicle in the fleet, such as by outputting an audible prompt that recites, "I don't see that you have a ride pending, but I can help you order one. Do you need assistance?" If the second user responds in the affirmative, the autonomous vehicle can then engage the second user in conversation to collect information from the second user. For example, the autonomous vehicle can query the second user to orally: confirm the current location of the autonomous vehicle as her desired pickup location or elect an alternative pickup location nearby; and specify her destination. In this example, the autonomous vehicle can also: audibly ask the second user if she would like to charge the payment method currently linked to her profile (e.g., a credit card) and provide minimal identifying information for this payment method (e.g., a nickname or the last four digits of the credit card); compile the second user's indicated pickup location, destination, payment method, and identifying information into a preliminary ride request; and automatically upload this preliminary ride request to the remote dispatcher for quoting, such as shown in FIG. 3.

In this example, the remote dispatcher can then: scan the autonomous vehicle fleet for a second autonomous vehicle available to collect the second user; calculate a cost, an arrival time at the pickup location, and/or an arrival time at the second user's destination; and return these data to the autonomous vehicle. The autonomous vehicle can then communicate these values to the second user in audible and/or visual formats and prompt the second user to confirm the ride request. Upon audible confirmation from the second user, the autonomous vehicle can return confirmation of the ride request to the remote dispatcher, and the remote dispatcher can dispatch the second autonomous vehicle to the second user's pickup location (e.g., the current location of the autonomous vehicle) accordingly.

In the foregoing example, if the autonomous vehicle is currently in a carpool mode (e.g., the user assigned to the autonomous vehicle has permitted the autonomous vehicle to pick up and drop off other passengers between her designated pickup and drop-off locations), the platform can consider the autonomous vehicle as an option for the second user. Accordingly, the autonomous vehicle can audibly indicate to the second user that the autonomous vehicle is currently available for carpool, indicate a cost of the trip and an estimated arrival time at the second user's destination should the second user elect this carpool option, and prompt the second user to either confirm this carpool option or elect a second, dedicated autonomous vehicle for her trip. If the second user audibly confirms this carpool option, the autonomous vehicle can automatically unlock one or more of its doors and/or its trunk to enable the second user to board the autonomous vehicle while waiting for the user originally assigned to the autonomous vehicle to arrive.

11.1 Autonomous Vehicle as Rideshare Kiosk when Idle

Similarly, after completing a ride, the autonomous vehicle can hold at this destination location or navigate to a waiting zone nearby to await assignment of a next ride request from the remote dispatch. While waiting for a next ride request, the autonomous vehicle can operate in kiosk mode to enable other patrons to request a ride directly through the autonomous vehicle rather than through their mobile devices. For example, in response to entry of the user into the vehicle and following receipt of confirmation from the user to depart toward a destination location specified in the user's ride request, the autonomous vehicle can autonomously navigate toward the destination location. Upon arrival at the destination location and departure of the user from the autonomous vehicle, the autonomous vehicle can autonomously navigate toward a waiting zone, such as near an area of high pedestrian traffic. While occupying the waiting zone, the autonomous vehicle can: scan the field near the autonomous vehicle for a second human approaching the autonomous vehicle; output a conversational prompt to the second human in response to detecting the second human proximal the autonomous vehicle; and recording a second audible response of the human. The platform can then: access a set of voiceprints characterizing speech of a set of users associated with user profiles on an autonomous vehicle ride platform associated with the autonomous vehicle; compare features in the audible response to the set of voiceprints; and identify the second human as a second user associated with a second user profile on the platform in response to the second audible response exhibiting characteristics represented in a second voiceprint—in the set of voiceprints—associated with the second user. The autonomous vehicle can then prompt the second user to confirm a second ride request, such as including a payment method, confirming a ride cost, and entering a destination location; and then unlock a door for the second user once the second user confirms the second ride request.

However, the platform can implement any other method or technique to enable a known user to enter a ride request for another vehicle through audible interactions with the autonomous vehicle, such as while the autonomous vehicle waits for its designated user to arrive.

12. Primary Identification by Facial Recognition

One variation of the method S100 shown in FIGS. 2 and 4 includes: receiving a ride request from the user, the ride request specifying a pickup location in Block S110; and accessing a faceprint characterizing facial features of the user in Block S112. This variation of the method S100 also includes, at the autonomous vehicle: autonomously navigating to the pickup location in Block S120; scanning a field near the autonomous vehicle for a human approaching the autonomous vehicle in Block S130; in response to detecting the human proximal the autonomous vehicle, recording an image of the human in Block S136; and detecting a face of the human in the image in Block S138. This variation of the method S100 further includes, in response to the face of the human detected in the image exhibiting features represented in the faceprint: identifying the human as the user in Block S140; and triggering a door of the autonomous vehicle to unlock for the user in Block S142.

This variation of the method S100 can further include, in response to the face of the human detected in the image exhibiting characteristics distinct from features represented in the faceprint: identifying the human as other than the user in Block S150; and serving a second prompt to the human indicating that the autonomous vehicle is reserved for other than the human in Block S152.

Generally, in this variation of the method S100, the platform can implement methods and techniques similar to those described above to identify a human near the autonomous vehicle as the user assigned to the autonomous vehicle based on similarities between visual characteristics of the human (e.g., the human's facial features, as detected in an image of the human recorded by the autonomous vehicle) and features depicted in a stored faceprint of the user.

12.1 Faceprint Failure

Furthermore, as described above, if the platform fails to identify a human near the autonomous vehicle based on visual characteristics of the human, the autonomous vehicle can transition to implementing methods and techniques described above to identify the human based on an audible response of the human to a prompt served to the human by the autonomous vehicle, as shown in FIGS. 2 and 4.

For example, in response to the face of the human detected in the image exhibiting characteristics distinct from features represented in the faceprint, the platform can identify the human as other than the user. Accordingly, the autonomous vehicle can: serve a conversational prompt to the human; record an audible response of the human to this prompt; access a voiceprint characterizing speech of the user; identify the human as the user in response to the audible response exhibiting characteristics represented in the voiceprint; and then trigger a door of the autonomous vehicle to unlock for the user accordingly.

Alternatively, in response to identifying the human as other than the user, the platform can: identify a second ride request received from a second user and designating a second pickup location proximal the pickup location; access a second faceprint characterizing facial features of the second user; and identify the human as the second user if the face of the human detected in the image exhibits features represented in the second faceprint. Then, in response to identifying the human as the second user, the platform can retrieve a status of a second autonomous vehicle assigned to the second ride request; and the autonomous vehicle can render this status of the second autonomous vehicle on a display arranged on the autonomous vehicle and facing the second user, such as described above.

Additionally or alternatively, in response to identifying the human as other than the user, the platform can: access a set of faceprints characterizing facial features of a set of users associated with user profiles on the platform; compare features of the face of the human depicted in the image to the set of faceprints; identify the human as a second user associated with a second user profile on the autonomous vehicle ride platform if the face of the human detected in the image exhibits characteristics represented in a second faceprint—in the set of faceprints—associated with the second user. In response to identifying the human as the second user, the autonomous vehicle can prompt the second user to initiate a second ride request; and the platform can dispatch a second autonomous vehicle to the autonomous vehicle's current location to collect the second user according to the second ride request.

13. Wireless Pairing

In one variation, after arriving at a pickup location and identifying the human as the user currently assigned to the autonomous vehicle, the autonomous vehicle can: prompt the user to connect (or "pair") her mobile device with the autonomous vehicle via a local ad hoc wireless network; and record a unique wireless identifier of the user's mobile device once connected to the autonomous vehicle. The platform can then store this unique wireless identifier of the user's mobile device in the user's profile.

When the same user submits a second ride request in the future and when a second autonomous vehicle is assigned to this second ride request, the platform can upload a copy of this unique wireless identifier of the user's mobile device to the second autonomous vehicle. Upon arriving at the pickup location specified in this second ride request, the second autonomous vehicle can: automatically query devices nearby for this unique wireless identifier; automatically connect to the user's mobile device if detected (such as within one meter of the second autonomous vehicle); and automatically unlock doors of the autonomous vehicle for the user upon connecting to the user's mobile device.

In this variation, the second autonomous vehicle can simultaneously execute Blocks of the method S100 described above to detect a human nearby, to identify this human as the user based on a stored voiceprint and/or faceprint of the user, and to unlock a door of the second autonomous vehicle accordingly—such as if the second autonomous vehicle is unable to connect to a device with this unique wireless identifier of the user's mobile device—thereby enabling the user to access the second autonomous vehicle even if the user's mobile device is powered down or if wireless services at the user's mobile device are disabled.

14. Concierge Services

In another variation, the platform can execute Blocks of the method S100 to enable a first user to enter a ride request on behalf of a second user and to enable the second user to access an autonomous vehicle assigned to this ride request.

In one example, the first user enters a ride request on behalf of the second user (e.g., a parent, a business associate, a client, or friend of the first user) and chaperones the second user to the autonomous vehicle—assigned to the ride request—upon arrival of the autonomous vehicle at a specified pickup location. The autonomous vehicle then implements methods and techniques described above to identify the first user near the autonomous vehicle and to unlock a door of the autonomous vehicle accordingly; the second user may then enter the autonomous vehicle and trigger the autonomous vehicle to depart toward a specified destination location, such as by selecting a physical button inside the autonomous vehicle.

In another example in which the first user enters a ride request on behalf of the second user but in which the second user approaches the autonomous vehicle—assigned to the ride request—with the first user, the autonomous vehicle and the platform can implement methods and techniques described above to: detect the second user approaching the autonomous vehicle; capture an image of the second user via a camera or other optical sensor arranged on the autonomous vehicle; and transmit a message—with the image of the second user—to the first user's mobile device with a prompt to confirm the second user's access to the autonomous vehicle. If the first user confirms the second user's access to the autonomous vehicle, the autonomous vehicle can unlock the door for the second user and enable the second user to initiate the ride, as described above.

In the foregoing example, if the first user intends to ride with the second user but is not yet present at the autonomous vehicle, the first user may respond to the message from the platform by confirming the second user's access to the autonomous vehicle but elect to withhold ride start controls from the second user. Accordingly, the autonomous vehicle can unlock a door for the second user to enable the second user to enter the autonomous vehicle. However, the autonomous vehicle can enable departure controls only once the autonomous vehicle detects that the first user is near and/or has entered the autonomous vehicle, such as according to methods and techniques described above.

Furthermore, when access to the autonomous vehicle for the second user is confirmed by the first user, either by the presence of the first user at the autonomous vehicle or remotely via the first user's mobile device, the platform can automatically initialize a user profile for the second user, such as including generating a voiceprint and/or a faceprint for the second user based on data collected by the autonomous vehicle when the second user approaches and/or occupies the autonomous vehicle during the ride. The platform can also link the second user's profile to the first user's profile on the platform.

The platform can then: enable the second user to submit ride requests via autonomous vehicles operating in the kiosk mode, as described above; and source payment for these rides from the first user's profile. For example, by submitting an order for a first ride for his mother, the first user may enable a link to his mother on the platform and enable payment for his mother's rides on the platform via the first user's stored payment method. Accordingly, the platform can enable the second user to enter ride requests directly through autonomous vehicles—and without requiring that the second user have her own mobile device or initialize her own user profile on the platform—and invoice the first user for his mother's rides accordingly.

In the foregoing example, the platform can also prompt the first user to confirm payment for each individual ride request later entered by the second user, such as via the first user's mobile device. Alternatively, the native rideshare application executing on the first user's mobile device can prompt the first user to confirm a maximum quantity of rides requested by the second user or a maximum monetary value of rides requested by the second user for which payment from the first user's stored payment method is authorized.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

What is claimed is:

1. A method for managing ridesharing, the method comprising:
   detecting a human approaching an autonomous vehicle;
   determining that the human is within a threshold distance of the autonomous vehicle;
   determining whether to prompt the human within the threshold distance of the autonomous vehicle;
   capturing biometric information of the human in response to determining whether to prompt the human within the threshold distance of the autonomous vehicle;
   determining whether the human is associated with a ride request corresponding to the autonomous vehicle by comparing the biometric information of the human to a set of biometric profiles associated with users; and
   providing a status of a second autonomous vehicle assigned to the human in response to a determination that the human is associated a second ride request different from the ride request.

2. The method of claim 1, wherein the status of the second autonomous vehicle includes an estimated time of arrival of the second autonomous vehicle according to the second ride request and a description of the second autonomous vehicle.

3. The method of claim 1, wherein the status of the second autonomous vehicle includes directions to a location of the second autonomous vehicle from a current location associated with the autonomous vehicle.

4. The method of claim 1, wherein the biometric information is captured using at least one of audio information or visual information.

5. The method of claim 1, wherein the status is provided audibly.

6. The method of claim 1, wherein the biometric information includes at least one of a face of the human detected in an image or an audible response of the human.

7. The method of claim 1, wherein access to the autonomous vehicle is provided in response to the human being associated with the ride request.

8. The method of claim 1, wherein the status of a second autonomous vehicle is provided audibly.

9. One or more tangible non-transitory computer-readable storage media storing computer-executable instructions for performing a computer process on a computing system, the computer process comprising:
   detecting a human approaching an autonomous vehicle;
   determining that the human is within a threshold distance of the autonomous vehicle;
   obtaining biometric information of the human in response to a determination of whether to prompt the human within the threshold distance of the autonomous vehicle;
   determining whether the human is associated with a ride request corresponding to the autonomous vehicle by comparing the biometric information of the human to a set of biometric profiles associated with users; and
   generating a status of a second autonomous vehicle assigned to the human in response to a determination that the human is associated a second ride request different from the ride request.

10. The one or more tangible non-transitory computer-readable storage media of claim 9, wherein the status of the second autonomous vehicle includes an estimated time of arrival of the second autonomous vehicle according to the second ride request and a description of the second autonomous vehicle.

11. The one or more tangible non-transitory computer-readable storage media of claim 9, wherein the status of the second autonomous vehicle includes directions to a location of the second autonomous vehicle from a current location associated with the autonomous vehicle.

12. The one or more tangible non-transitory computer-readable storage media of claim 9, wherein the biometric information is captured using at least one of audio information or visual information.

13. The one or more tangible non-transitory computer-readable storage media of claim 9, wherein the status is provided audibly.

14. The one or more tangible non-transitory computer-readable storage media of claim 9, wherein the biometric information includes at least one of a face of the human detected in an image or an audible response of the human.

15. The one or more tangible non-transitory computer-readable storage media of claim 9, wherein access to the autonomous vehicle is provided in response to the human being associated with the ride request.

16. One or more tangible non-transitory computer-readable storage media storing computer-executable instructions for performing a computer process on a computing system, the computer process comprising:
   detecting a human approaching an autonomous vehicle;
   determining that the human is within a threshold distance of the autonomous vehicle;
   causing ride request information from the human to be captured in response to determining that the human is within the threshold distance;
   generating a ride request for the human based on the ride request information;
   designating a specific autonomous vehicle from a fleet of autonomous vehicles corresponding to the ride request; and
   providing access to the autonomous vehicle when the specific autonomous vehicle is the autonomous vehicle.

17. The one or more tangible non-transitory computer-readable storage media of claim 16, the computer process further comprising:
   dispatching the specific autonomous vehicle a pickup location associated with the ride request when the autonomous vehicle is different from the specific autonomous vehicle.

18. The one or more tangible non-transitory computer-readable storage media of claim 16, the computer process further comprising:
   generating a status of the specific autonomous vehicle associated with the ride request when the autonomous vehicle is different from the specific autonomous vehicle, the status being provided to the human.

19. The one or more tangible non-transitory computer-readable storage media of claim 18, wherein the status of the specific autonomous vehicle includes an estimated time of arrival of the specific autonomous vehicle according to the ride request and a description of the specific autonomous vehicle.

20. The one or more tangible non-transitory computer-readable storage media of claim 18, wherein status of the specific autonomous vehicle includes directions to a location of the specific autonomous vehicle from a current location associated with the autonomous vehicle.

21. The one or more tangible non-transitory computer-readable storage media of claim 16, wherein the ride request information is captured from voice input from the human.

* * * * *